(12) United States Patent
Huynh

(10) Patent No.: US 9,874,144 B2
(45) Date of Patent: Jan. 23, 2018

(54) SUPERSONIC CARET INLET SYSTEM

(71) Applicant: The Boeing Company, Chicago, IL (US)

(72) Inventor: Thuy Huynh, Ofallon, MO (US)

(73) Assignee: The Boeing Company, Chicago, IL (US)

(*) Notice: Subject to any disclaimer, the term of this patent is extended or adjusted under 35 U.S.C. 154(b) by 491 days.

(21) Appl. No.: 14/603,666

(22) Filed: Jan. 23, 2015

(65) Prior Publication Data

US 2016/0273452 A1  Sep. 22, 2016

(51) Int. Cl.
*F02C 1/00* (2006.01)
*F02C 7/042* (2006.01)
*B64D 33/02* (2006.01)
*F02C 7/057* (2006.01)

(52) U.S. Cl.
CPC ............ *F02C 7/042* (2013.01); *B64D 33/02* (2013.01); *F02C 7/057* (2013.01); *B64D 2033/026* (2013.01); *B64D 2033/0273* (2013.01); *F05D 2220/80* (2013.01); *F05D 2250/11* (2013.01)

(58) Field of Classification Search
CPC .... F02C 7/042; F02C 7/057; B64D 2033/026; B64D 2033/0273; B64D 2033/0286; F05D 2220/80; Y10T 137/0536; Y10T 137/0645
See application file for complete search history.

(56) References Cited

U.S. PATENT DOCUMENTS

| 3,485,252 A | 12/1969 | Brown | |
| 5,005,782 A * | 4/1991 | Falempin | B64D 33/02 137/15.1 |
| 7,721,989 B2 | 5/2010 | Dyer et al. | |
| 2007/0181743 A1* | 8/2007 | Klinge | B64C 21/10 244/62 |
| 2014/0182697 A1 | 7/2014 | Davidenko | |

FOREIGN PATENT DOCUMENTS

| DE | 3447141 A1 | 7/1986 | |
| GB | 932751 A * | 7/1963 | F02C 7/042 |

OTHER PUBLICATIONS

Hamstra, Jeffrey W. et al. "Tactical Aircraft Aerodynamic Integration", Encyclopedia of Aerospace Engineering, Jan. 1, 2010 (retrieved from Internet URL:www.f-16.net/forum/download/file.php?id=19301.

* cited by examiner

Primary Examiner — Pascal M Bui Pho
Assistant Examiner — Edwin Kang
(74) Attorney, Agent, or Firm — Felix L. Fischer

(57) ABSTRACT

An engine inlet for efficient operation in both subsonic and supersonic flight wherein the inlet has a caret configuration is rotatable about an off-body axis for compression ramp angle and capture area variation and a diffuser is engaged to the inlet in a scrubbing relationship to maintain a seal upon rotation of the inlet.

17 Claims, 11 Drawing Sheets

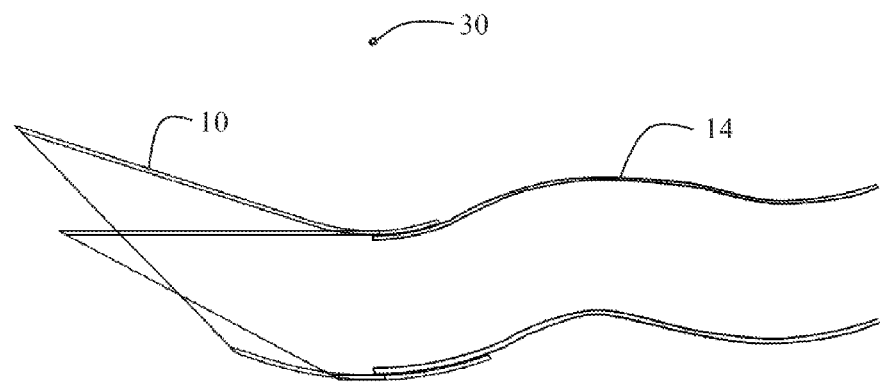
FIG. 5D
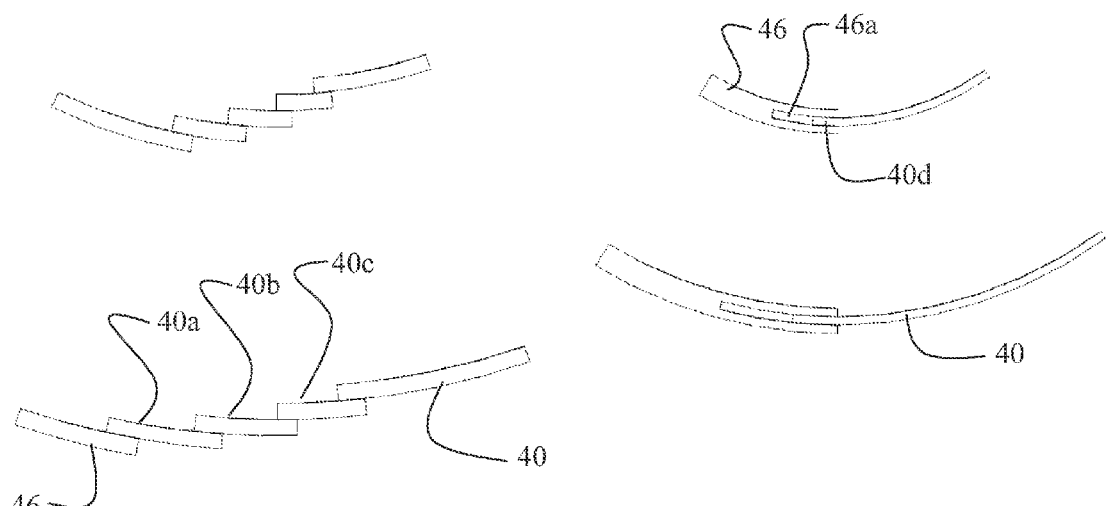
FIG. 5E
FIG. 5F

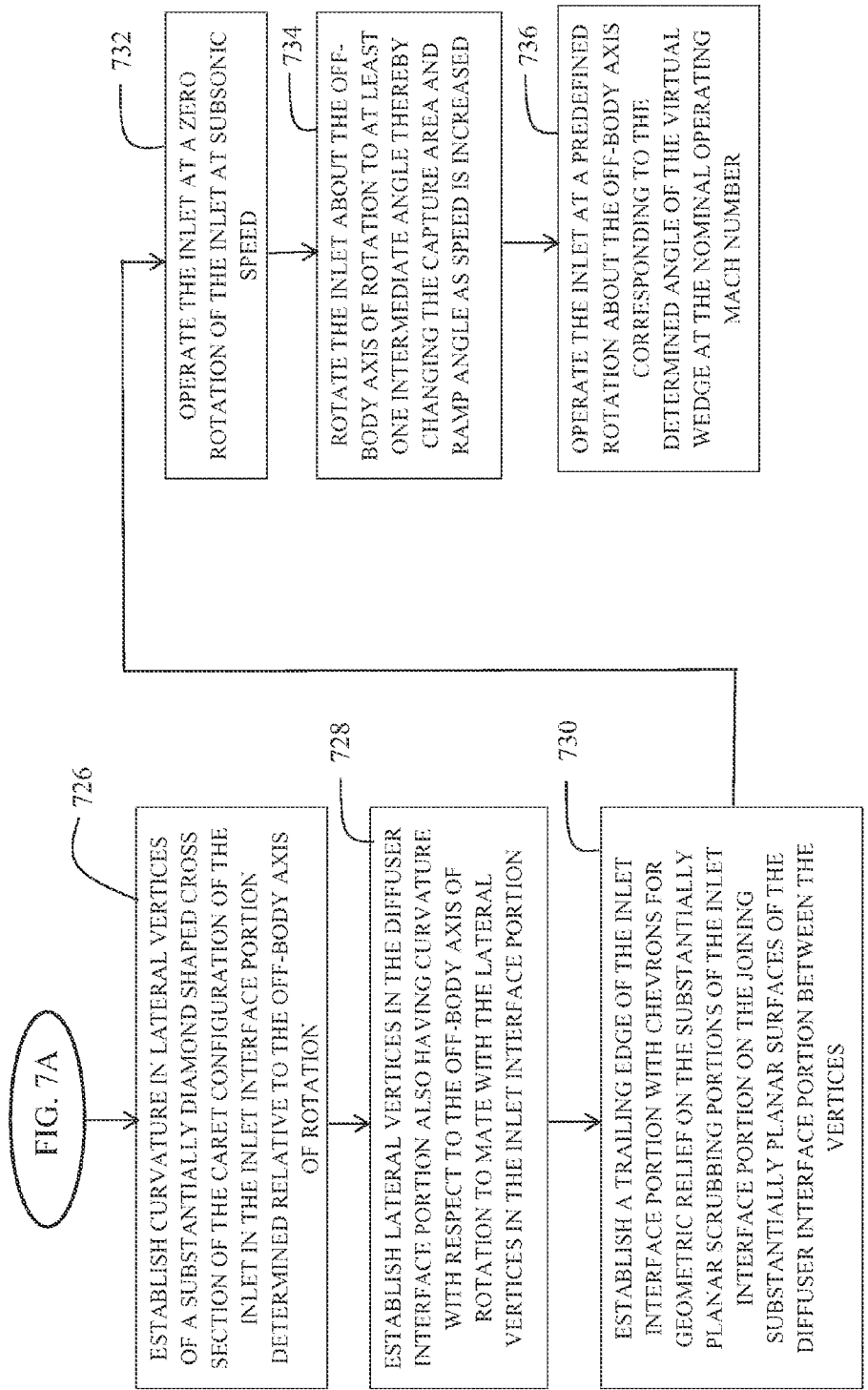

SUPERSONIC CARET INLET SYSTEM

BACKGROUND INFORMATION

Field

Embodiments of the disclosure relate generally to supersonic inlets for aircraft jet engines and more particularly to a caret inlet capable of varying ramp angle as well as capture area.

Background

Engine inlets for supersonic aircraft have complex aerodynamic requirements based on Mach number and other flight conditions. Fixed inlet geometries typically have highest efficiency at one specific Mach number and flight condition. Operation at other speeds or flight conditions results in degradation of the aerodynamic performance or efficiency of the inlet. To allow flight at varying Mach number, mechanical systems to adjust the capture area and ramp geometry of the inlet may be employed to increase efficiency. An existing solution to a variable ramps and variable capture inlet is the F-15 Eagle produced by The Boeing Company. This inlet system is highly efficient and is recognized as an optimized inlet design. However, later-generation fighters require unique shaping where the inlet aperture edges are highly swept. In such aircraft a caret-type inlet system is employed. Examples of aircraft employing such inlets are the F-18E/F Super Hornet produced by The Boeing Company and the F-22 Raptor produced by Lockheed Martin. These inlets are fixed geometry inlets and were designed for optimized operation at a particular flight Mach number. At off-design Mach numbers, a fixed-geometry inlet system may not provide the best shaping to maximize pressure recovery. In addition, because the inlet capture area is fixed, the inlet tends to capture more mass flow than the engine needs at lower speed than at the inlet sizing condition. As a result, the excess airflow will have to be spilled or dumped through a bypass; both of which will create additional inlet drag. Because the F-15 inlet system is not a caret-type inlet with the highly swept edges, it is not employed on current-generation fighter aircraft.

It is therefore desirable to provide a variable inlet which maximizes pressure recovery across the Mach envelope range to obtain higher pressure recovery at the engine face for maximizing thrust and fuel efficiency and to minimize inlet spill drag to maximize the propulsion system net propulsive force, thereby maximizing aircraft performance. It is also desirable that the variable inlet operate in an efficient manner without generating additional complexities such as opening gaps that will require more additional mechanisms or seals for closure.

SUMMARY

Exemplary embodiments provide an engine inlet for efficient operation in both subsonic and supersonic flight wherein the inlet has a caret configuration. The inlet is rotatable about an off-body axis for compression ramp angle and capture area variation and a diffuser is engaged to the inlet in a scrubbing relationship to maintain a seal upon rotation of the inlet.

The embodiments provide methods for maximizing pressure recovery and minimizing drag across a range of subsonic and supersonic velocities by providing an external compression caret inlet rotatable about an off-body axis of rotation to increase capture area and ramp angle. The inlet is then rotated to greater angles as speed is increased.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

FIG. 5D is a simplified side section view of the fully rotated caret inlet overlaid on the unrotated inlet;

FIG. 5E is a simplified side section view of a first alternative embodiment of the scrubbing surfaces;

FIG. 5F simplified side section view of a second alternative embodiment of the scrubbing surfaces;

FIGS. 7A and 7B are a flow chart for a method of design for a rotating caret inlet.

DETAILED DESCRIPTION

The system and methods described herein provide embodiments for a caret inlet aperture that is derived from a single virtual wedge/ramp. The entire caret inlet aperture rotates about an off-body axis to achieve both ramp angle variation as well as capture area variation. The aft-end of the caret inlet aperture is arc-shaped defined by the off-body axis of rotation and is mated with a front end of the diffuser which is also arc-shaped defined by the off-body axis of rotation. Because the aft-end of the caret and front-end of the diffuser are arc-shaped about a common axis, these surfaces scrub each other during operation to vary the orientation and do not open any additional gaps or require flexible interfaces between sealing or aerodynamic surfaces.

Figure 1A:
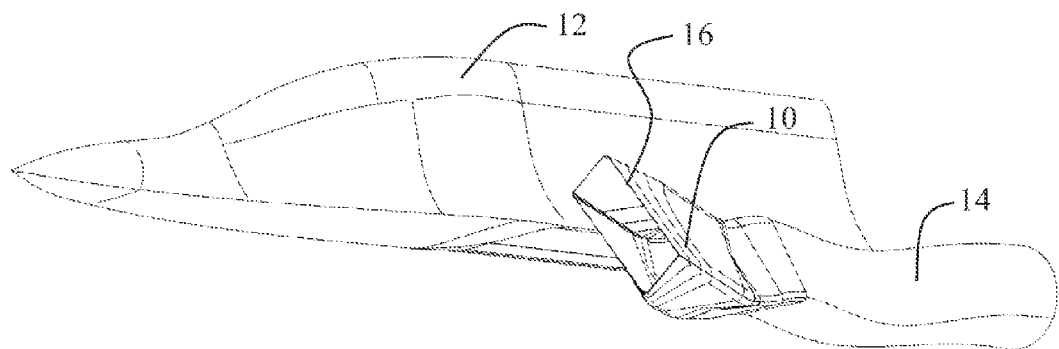
FIG. 1A is a perspective view of a fuselage portion and associated caret inlet with a representative diffuser section of a representative aircraft.
Figure 1B:
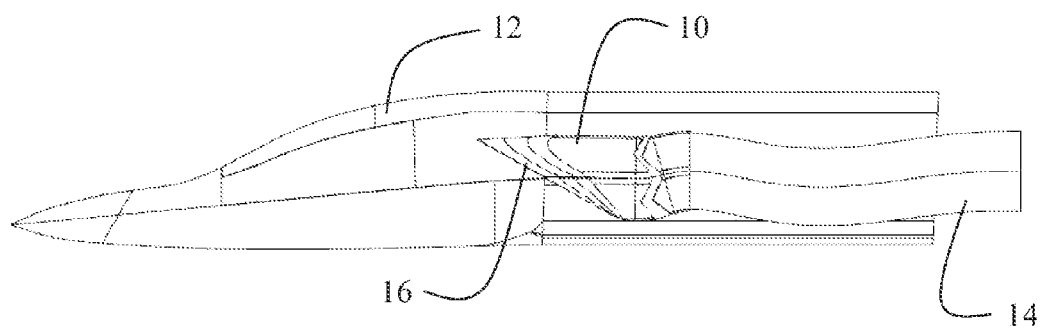
FIG. 1B is a side view of the aircraft of FIG. 1A.
Figure 1C:
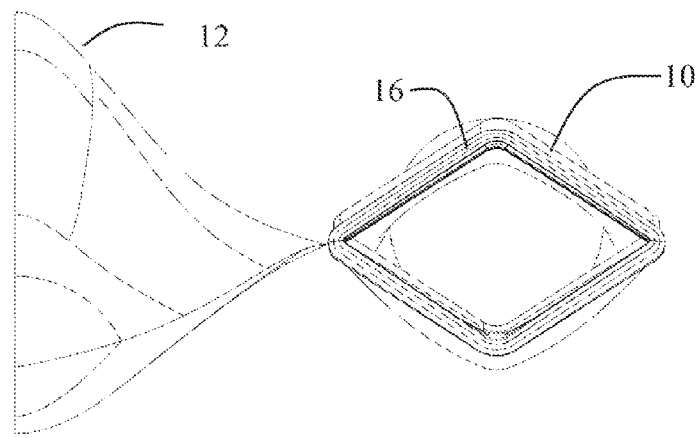
FIG. 1C is a front view of the aircraft of FIG. 1A.
Figure 2A:
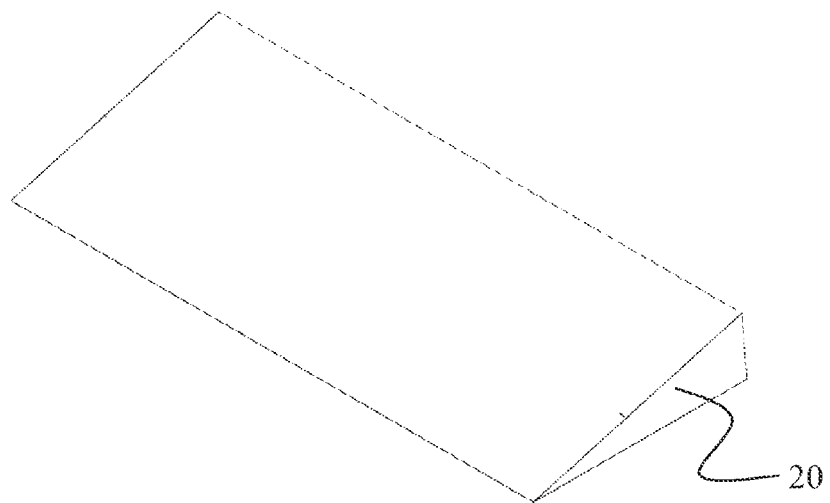
FIG. 2A is a pictorial representation of a virtual wedge simulating an inlet angle for a representative caret inlet at supersonic speed.
Figure 2B:
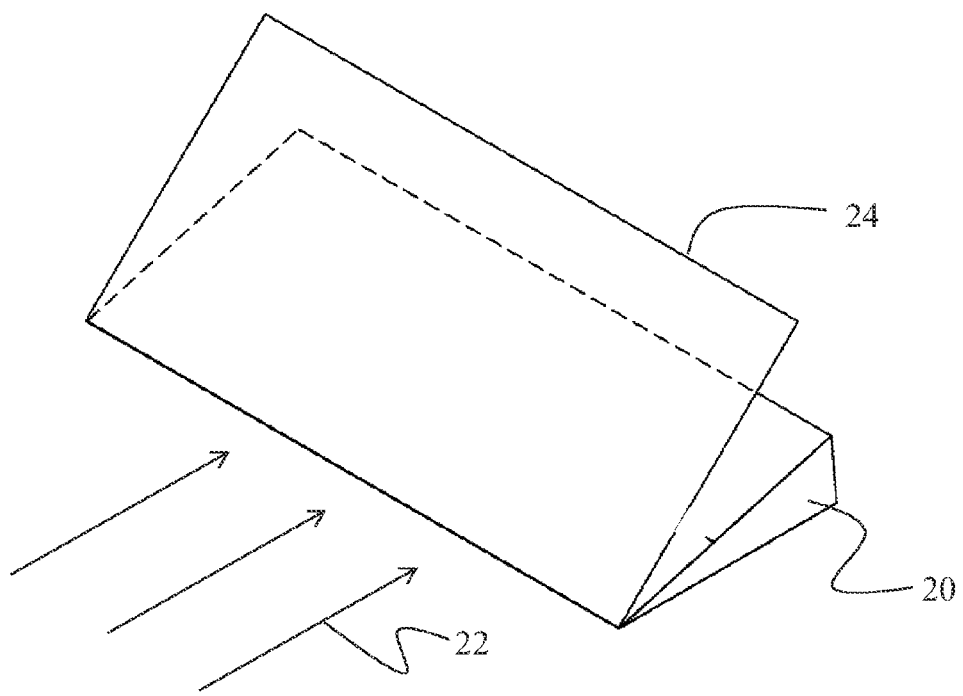
FIG. 2B is a pictorial representation of the shock wave created by the virtual wedge.
Figure 2C:
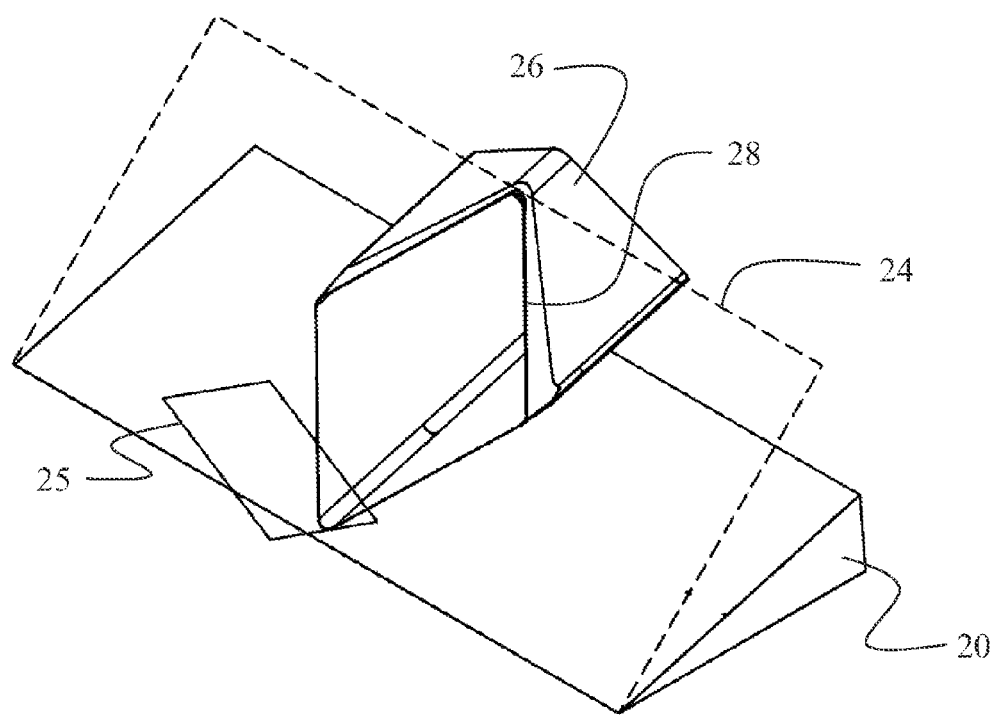
FIG. 2C is a pictorial representation of an inlet duct with a streamline trace of a projected edge on the shock wave.
Figure 2D:
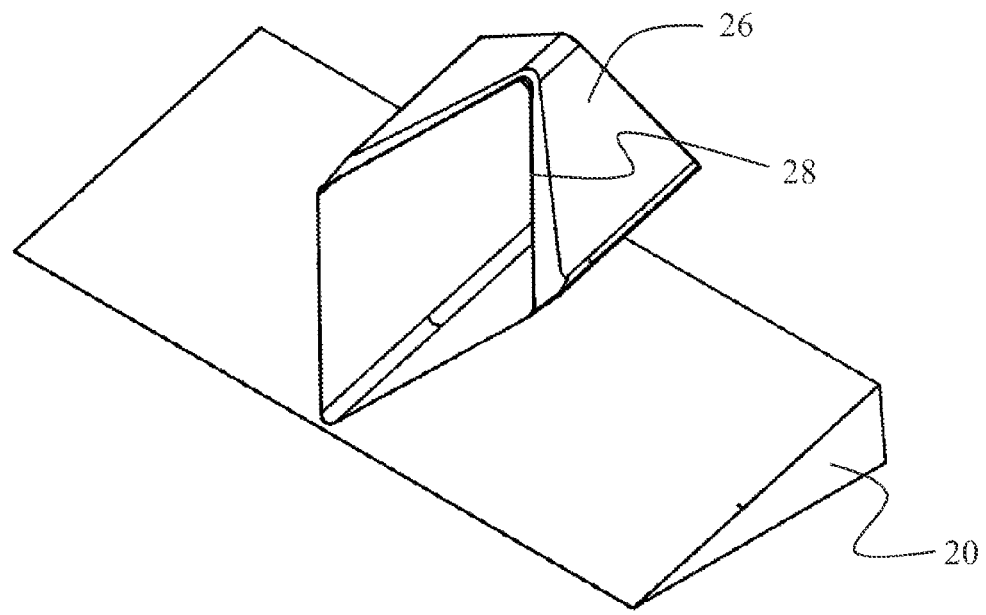
FIG. 2D is a pictorial representation of the inlet duct with an aperture formed by the resulting projected edge.

Referring to the drawings, FIGS. 1A-1C show representative portions of an exemplary aircraft employing the embodiments of a caret inlet as disclosed herein. A caret inlet 10 is placed adjacent a fuselage 12. A diffuser 14 extends from the caret inlet to a jet engine (not shown). The leading edges 16 of the caret inlet 10 are highly swept. The edge shape and associated angle are defined based on a virtual wedge established based on a design inlet angle for a nominal design Mach number. An example of a virtual wedge 20 is shown in FIG. 2A (the images of FIGS. 2A-2E are shown in an inverted perspective for clarity). Supersonic flow represented by arrows 22 striking the virtual wedge 20 will result in a virtual shock wave 24 as shown in FIG. 2B. For a given inlet profile 25 for an inlet duct 26, a streamline trace from the inlet profile of a projected edge 28 on the virtual shock wave 24 provides a definition for the caret inlet as shown in FIG. 2C. With the shock wave removed for clarity, the resulting inlet duct 26 is seen in FIG. 2D.

Figure 2E:
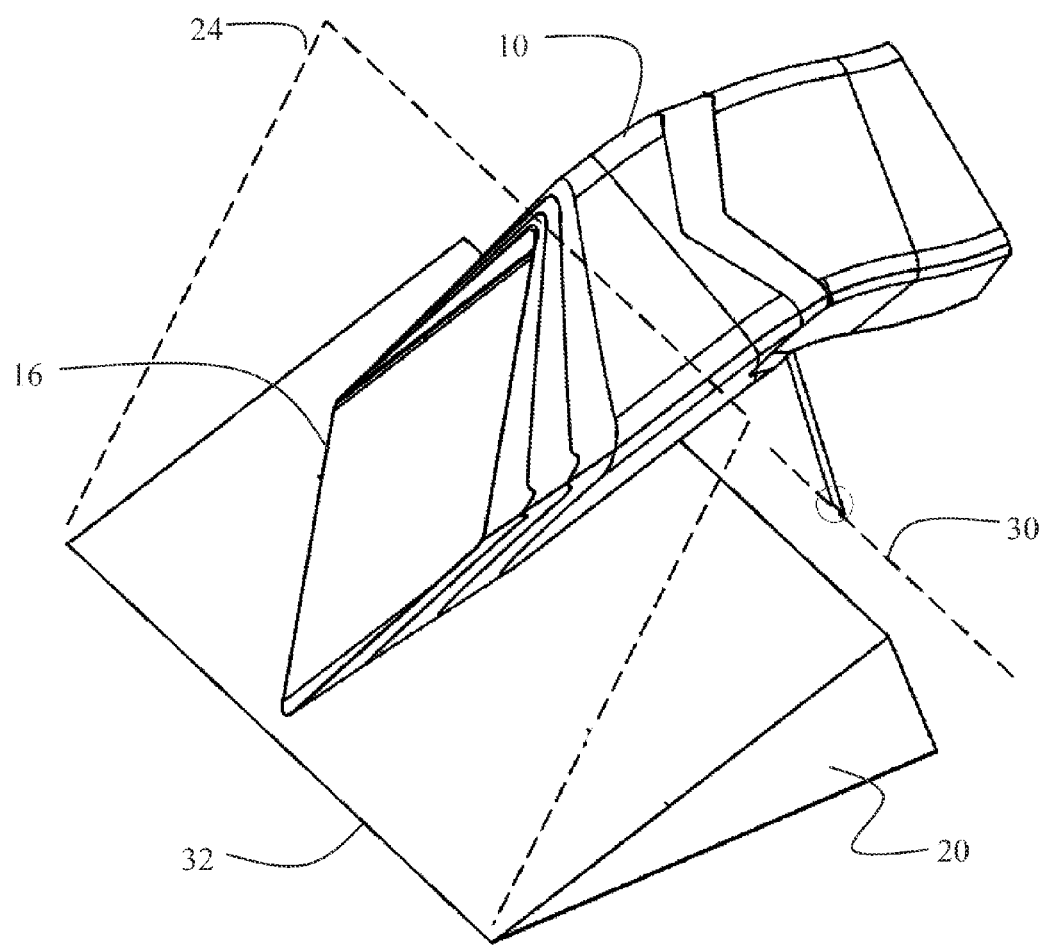
FIG. 2E is a pictorial representation of an implemented caret inlet and diffuser section employing the inlet duct of FIG. 2D.

As shown in FIG. 2E, a complete caret inlet 10 may then be implemented with leading edges 16 based on the projected edge 28 for the inlet duct with an inlet angle commensurate with the virtual wedge 20. The present embodiments provide an adjustable angle for the caret inlet to accommodate differing supersonic speeds below the nominal design Mach number. As will be described in greater detail subsequently, rotation of the caret inlet is established around an off-body axis of rotation 30 for the aperture. The off-body axis of rotation 30 is parallel to a leading edge 32 of the virtual wedge 20.

Figure 3A:
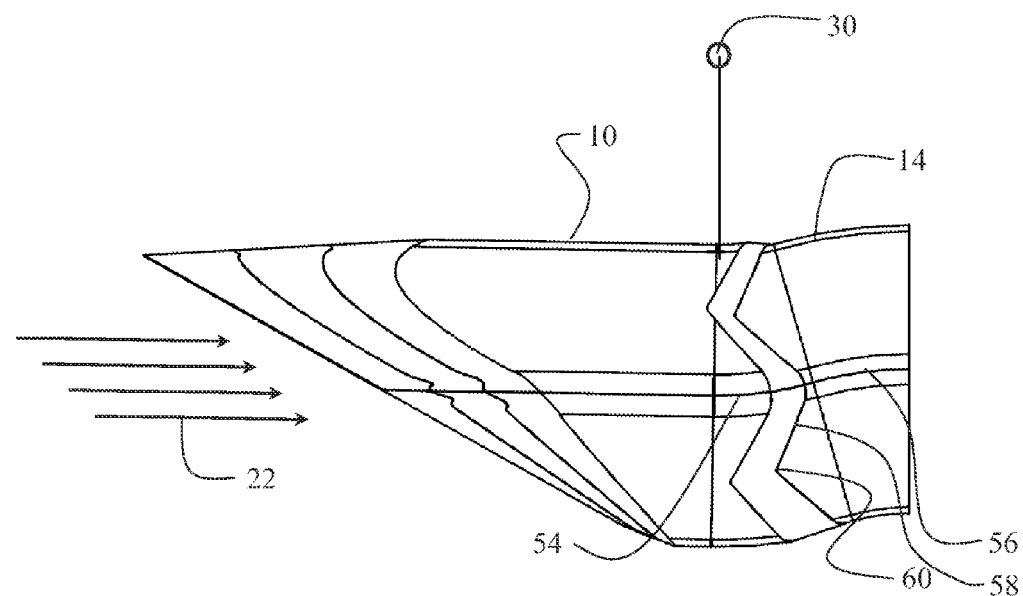
FIG. 3A is a side view of the caret inlet in a subsonic unrotated position.
Figure 3B:
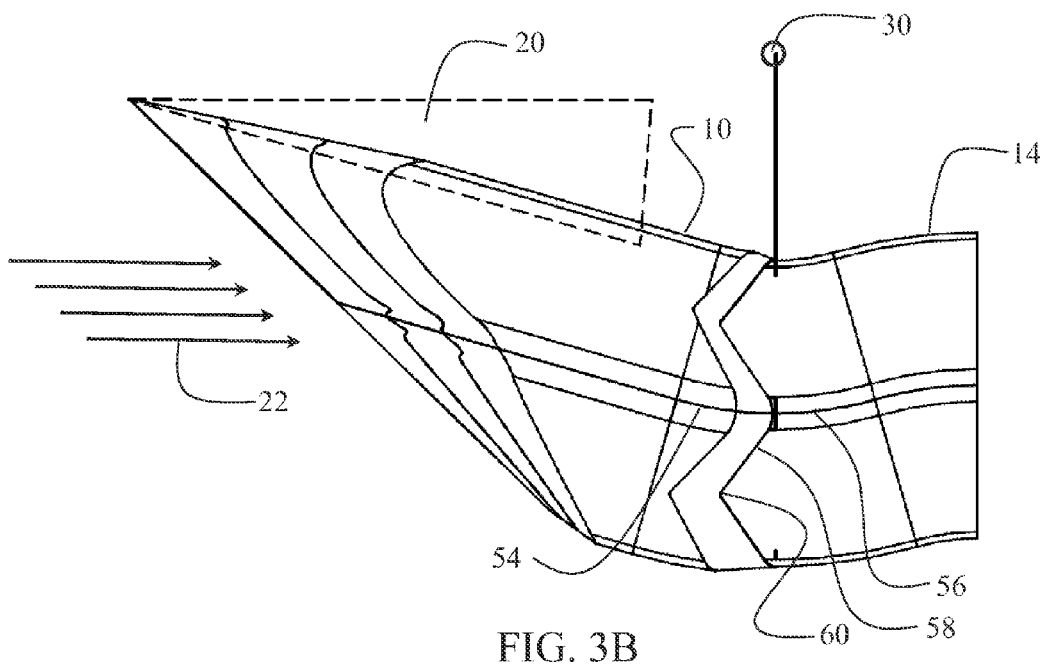
FIG. 3B is a side view of the caret inlet in a rotated position for design supersonic speed with the representative virtual wedge superimposed on the image.
Figure 4A:
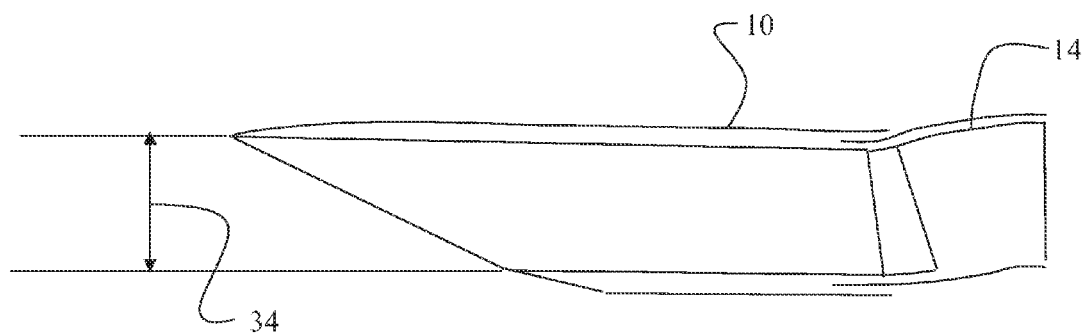
FIG. 4A is a side section view of the caret inlet in the unrotated position demonstrating inlet area relative to the flow direction.
Figure 4B:
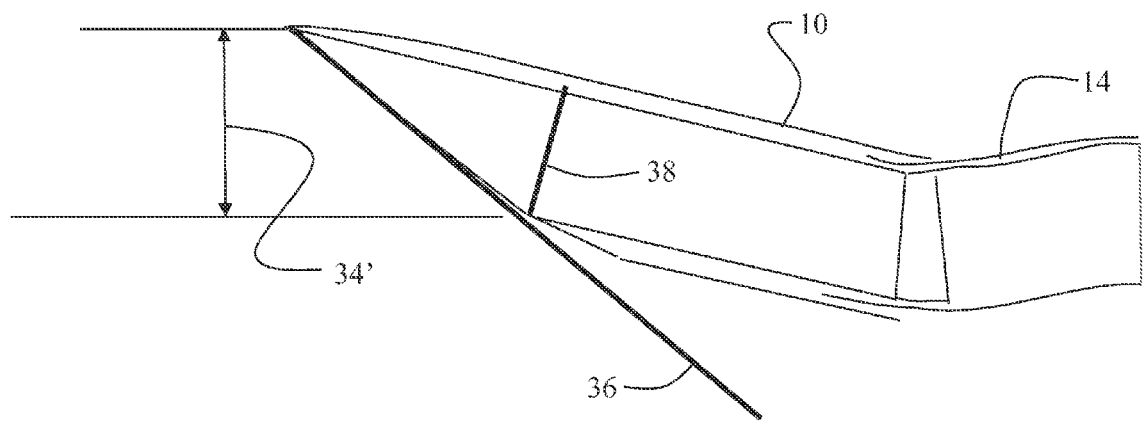
FIG. 4B is a side section view of the caret inlet in the rotated position demonstrating the inlet area, oblique shock and normal shock induced by the relative inlet flow.

The complete caret inlet 10 is shown in FIGS. 3A and 3B in an unrotated and fully rotated position relative to the free stream flow 22, respectively. The profile of the virtual wedge 20 is shown for reference in FIG. 3B. Rotation of the caret inlet occurs around the off-body axis of rotation 30, shown for reference. In the unrotated position, the caret inlet presents a reduced capture area to the free stream flow as represented by the vertical dimension 34 shown in FIG. 4A. In the rotated position, the caret inlet 10 presents a design point capture area to the free stream as represented by vertical dimension 34' which is larger to accommodate the necessary airflow at the design point Mach number. An oblique shock wave 36 is formed at the inlet entrance and a normal shock wave 38 is formed in the inlet, the oblique shock wave substantially commensurate with the virtual shock wave employed in the design as described with respect to FIGS. 2A-2E.

Figure 5A:
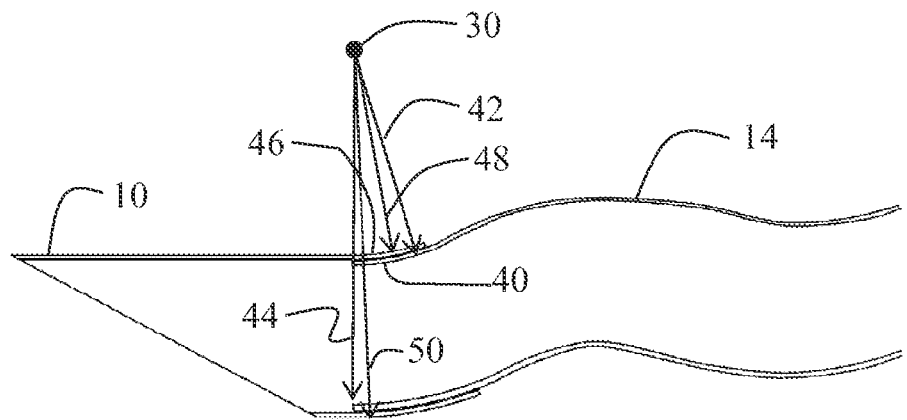
FIGS. 5A, 5B and 5C are simplified side section views showing the scrubbing surface interaction of the caret inlet and diffuser interface for the unrotated, intermediate rotation, and full rotation of the caret inlet about an off-body axis of rotation for the aperture.
Figure 5B:
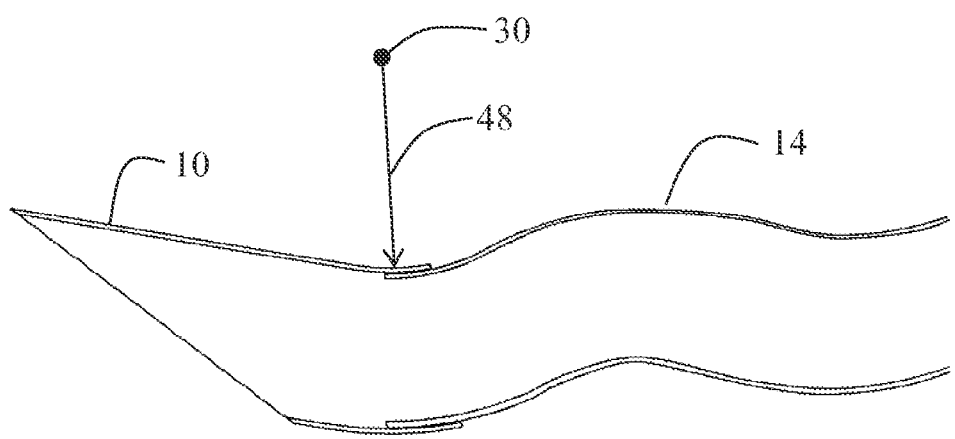
Figure 5C:
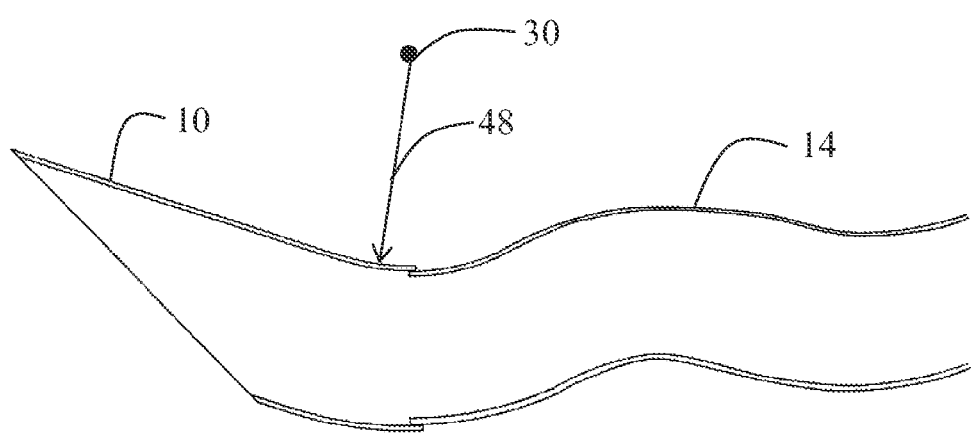

Rotation of the caret inlet 10 about the off-body axis of rotation 30 allows geometric sizing of the inlet and diffuser interface for sliding or scrubbing engagement. As shown for a simplified section profile in FIGS. 5A-5C, the profile of the diffuser interface portion 40 is formed with a top radius 42 and bottom radius 44 both originating at the off-body axis of rotation 30. For the embodiment shown, the diffuser interface portion 40 is received within a caret inlet interface portion 46 which has a top radius 48 and bottom radius 50, sized smaller and larger than radii 42 and 44 respectively to closely receive the diffuser interface portion 40 within the caret inlet interface portion 46. The common center for the radii on the off-body axis of rotation 30 allows rotation of the caret inlet through a range of angles while maintaining sliding or scrubbing contact of the caret inlet interface portion and diffuser inlet portion as seen in FIGS. 5B and 5C for a midrange rotation and full range rotation respectively.

FIG. 5D shows an overlay of the relative shapes of the caret inlet and diffuser in the unrotated and fully rotated positions.

While shown in FIGS. 5A-5D is a simple interface, the combined interface between the caret inlet and diffuser may incorporate multiple interlaced scales 40a, 40b and 40c each having an arc shape relative to the off-body axis of rotation and engaging each other telescopically in a scrubbing relationship (thicknesses are exaggerated for clarity). A forward scale 40a engaging the inlet interface portion 46 in a scrubbing relationship and an aft scale 40c engaging the diffuser interface portion 40 in a scrubbing relationship as shown in FIG. 5E. While three scales are shown, a greater or fewer number of scales may be employed.

Alternatively, a slot 46a having an arc shape relative to the off-body axis of rotation may be provided in the inlet interface portion and a receiver 40d comprising a termination of the arc shaped diffuser interface 40 closely received in the slot 46a as shown in FIG. 5F may be employed. The slot may be placed in inlet interface portion receiving the arc of the diffuser interface portion or may be placed in the diffuser interface portion receiving the arc of the inlet interface portion.

Returning to FIGS. 3A and 3B, the lateral vertices 54 of the substantially diamond shaped cross section of the caret inlet 10 are curved in the inlet interface portion relative to the off-body axis of rotation to mate with lateral vertices 56 in the diffuser interface portion also curved with respect to the off-body axis of rotation. A trailing edge 58 of the inlet interface portion may include chevrons 60 on the substantially planar portions for geometric relief on the scrubbing portions of the inlet interface portion on the joining substantially planar surfaces of the diffuser interface portion between the vertices.

Figure 6A:
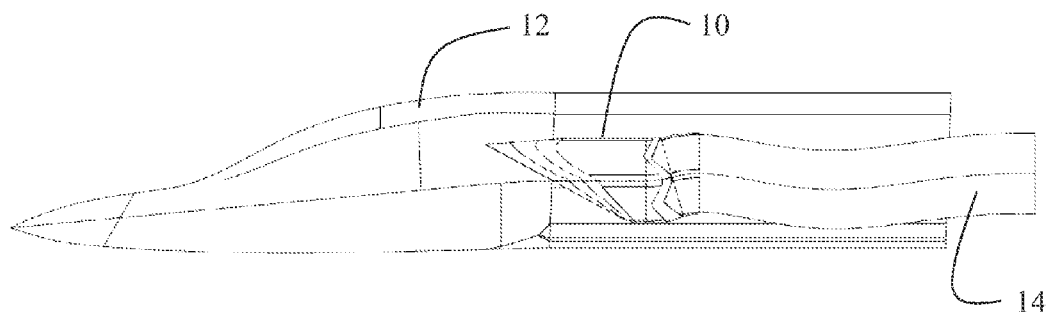
FIGS. 6A, 6B and 6C are side views of the exemplary aircraft implementation of the caret inlet in the unrotated, partially rotated and fully rotated positions.
Figure 6B:
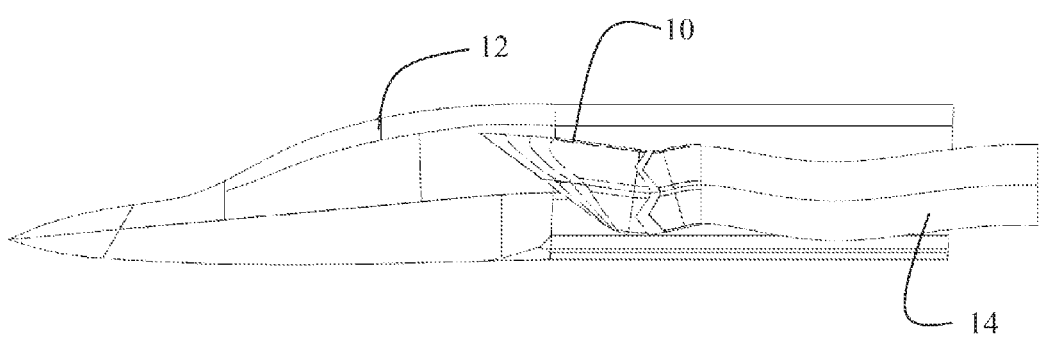
Figure 6C:
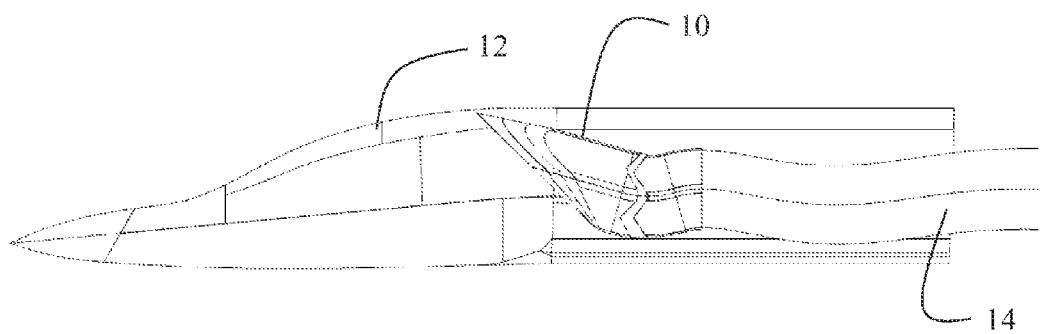

The resulting caret inlet arrangement for the embodiments described provides a highly efficient inlet for both subsonic and supersonic operation of an aircraft for which highly swept inlet edges are desirable. As seen in FIG. 6A for the subsonic condition caret inlet 10 is unrotated providing a reduced inlet capture area for efficient operation minimizing spill drag. At supersonic speeds, the caret inlet is rotatable about the off-body axis through a range of angles to achieve both compression ramp variation and capture area variation thereby allowing a range of efficient supersonic operation as represented by an intermediate rotation shown in FIG. 6B to a maximum nominal design Mach number as shown with the full rotation in FIG. 6C.

Figure 7A:
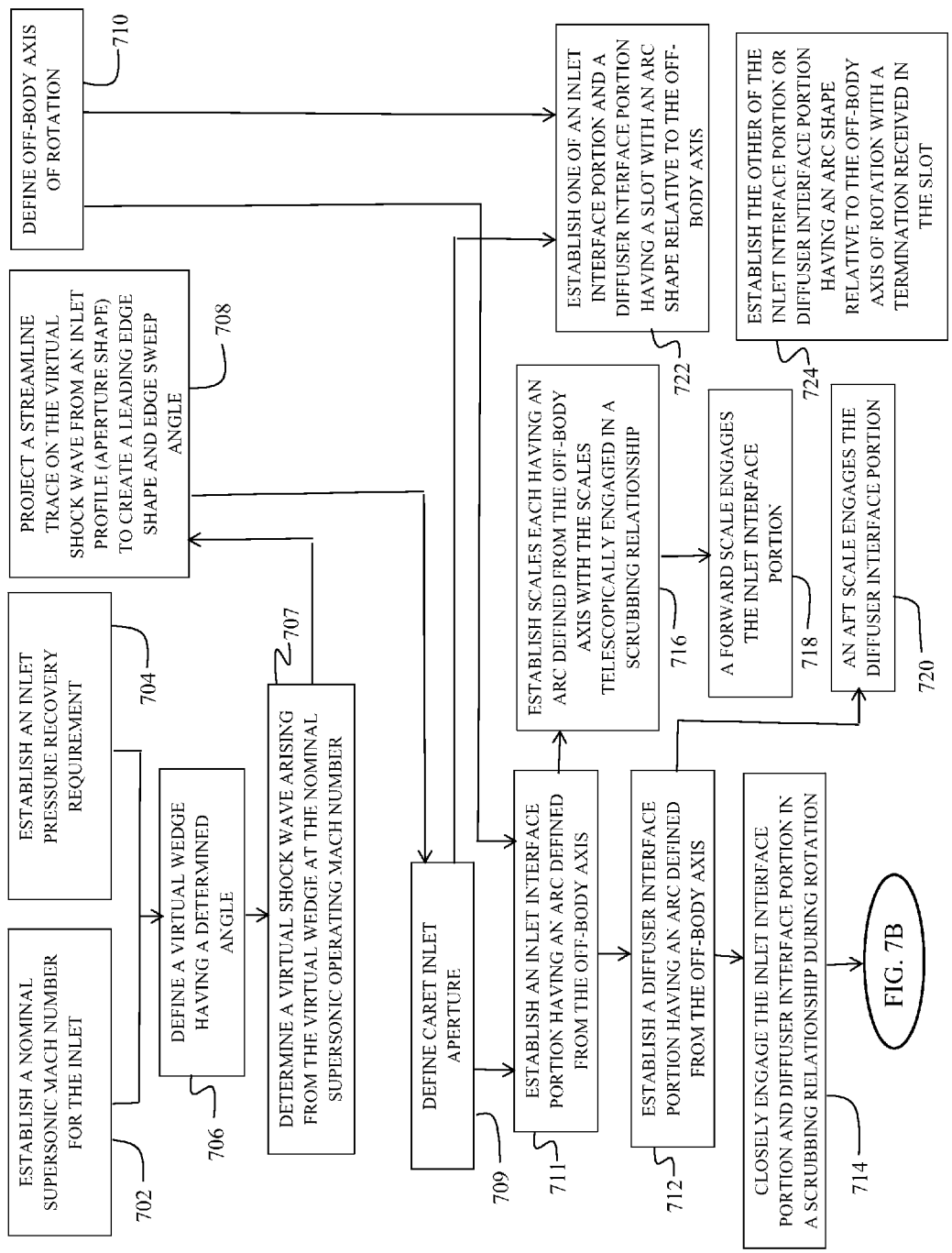

A method of maximizing pressure recovery and minimizing drag across a range of subsonic and supersonic velocities provided by the embodiments disclosed is shown in FIGS. 7A and 7B. An external compression caret inlet is provided which is rotatable about an off-body axis of rotation to increase capture area and ramp angle. To provide the external compression caret inlet a nominal supersonic Mach number is established for the inlet, step 702, and an inlet pressure recovery requirement is established, step 704, to define a virtual wedge having a determined angle, step 706. A virtual shock wave arising from the virtual wedge at the nominal supersonic operating Mach number is determined, step 707 and streamline trace is projected on the virtual shock wave from an inlet profile (aperture shape) to create a leading edge shape and edge sweep angle, step 708 and the caret inlet aperture is defined, step 709. To provide a seal between the inlet and a diffuser during rotation, an off-body axis of rotation is defined, step 710, an inlet interface portion is established having an arc defined from the off-body axis, step 711, and a diffuser interface portion is established having an arc defined from the off-body axis, step 712. The inlet interface portion and diffuser interface portion are closely engaged in a scrubbing relationship during rotation of the inlet, step 714. As an alternative, the inlet interface portion may be established having an arc defined from the off-body axis of rotation and the diffuser interface portion having an arc defined from the off-body axis of rotation. However, a plurality of scales may then be established each having an arc defined from the off-body axis of rotation with the scales telescopically engaging one another in a scrubbing relationship to maintain a seal, step 716. A forward scale engages the inlet interface portion, step 718, and an aft scale engages the diffuser interface portion, step 720, in a scrubbing relationship to maintain the seal during rotation of the inlet. As yet another alternative, one of the inlet interface portion and diffuser interface portion may be established having a slot with an arc shape relative to the off-body axis of rotation, step 722, and the other of the inlet interface portion or diffuser interface portion may then be established having an arc shape relative to the off-body axis of rotation with a termination received in the slot, step 724. To maintain the scrubbing relationship between the inlet interface portion and the diffuser interface portion, curvature is established in lateral vertices of a substantially diamond shaped cross section of the caret configuration of the inlet in the inlet interface portion determined relative to the off-body axis of rotation, step 726. Lateral vertices in the diffuser interface portion are then established also having curvature with respect to the off-body axis of rotation to mate with the lateral vertices in the inlet interface portion, step 728. A trailing edge of the inlet interface portion may also be established with chevrons for geometric relief on the substantially planar scrubbing portions of the inlet interface portion on the joining substantially planar surfaces of the diffuser interface portion between the vertices, step 730.

The inlet is then operated at a zero rotation of the inlet at subsonic speed, step 732, and rotated about the off-body axis of rotation to at least one intermediate angle thereby changing the capture area and ramp angle as speed is increased, step 734. The inlet is operated at a predefined rotation about the off-body axis corresponding to the determined angle of the virtual wedge at the nominal operating Mach number, step 736.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An engine inlet for operation in both subsonic and supersonic flight, the engine inlet comprising:
    a leading edge forming a substantially kite shaped cross sectional opening of the engine inlet;
    an inlet interface portion downstream of the leading edge, the inlet interface portion having a first top radius, a first bottom radius and a first set of lateral vertices, the first set of lateral vertices having a first arc shape;
    a fixed diffuser having a diffuser interface portion, the diffuser interface portion having a second too radius, a second bottom radius and a second set of lateral vertices, the second set of lateral vertices having a second arc shape, wherein said second set of lateral vertices mate with the first set of lateral vertices;
    wherein the engine inlet is rotatable about an axis of rotation offset from an exterior surface of the inlet interface portion and the diffuser interface portion, said axis of rotation comprising a common center for the first top radius, the first bottom radius, the second top radius, the second bottom radius, the first arc shape, and the second arc shape for compression ramp angle and capture area variation.

2. The engine inlet as defined in claim 1 wherein said fixed diffuser is engaged to the engine inlet in a scrubbing relationship to maintain a seal upon rotation of the engine inlet.

3. The engine inlet as defined in claim 1 wherein the inlet interface portion engages the diffuser interface portion during rotation of the engine inlet about the axis of rotation, whereby opposing surfaces of the inlet interface portion and the diffuser interface portion engage one another in a scrubbing relationship to maintain a seal.

4. The engine inlet as defined in claim 1 further comprising:
    a plurality of scales, each of the plurality of scales having a third arc shape relative to the axis of rotation, wherein the each of the plurality of scales telescopically engages adjacent scales of the plurality of scales in at least one first scrubbing relationship to maintain at least one first seal during rotation of the engine inlet, a forward scale engaging the inlet interface portion in a second scrubbing relationship to maintain a second seal between the forward scale and the inlet interface portion during rotation of the engine inlet, and an aft scale engaging the diffuser interface portion in a third scrubbing relationship to maintain a third seal between the aft scale and the diffuser interface portion during rotation of the engine inlet.

5. The engine inlet as defined in claim 1 wherein the inlet interface portion has a slot with the first arc shape, and a termination portion of the diffuser interface portion is received in the slot.

6. The engine inlet as defined in claim 1 wherein the diffuser interface portion has a slot with the second arc shape, and a termination portion of the inlet interface portion is received in the slot.

7. The engine inlet as defined in claim 1 wherein a trailing edge of the inlet interface portion includes chevrons for geometric relief on a first set of substantially planar scrubbing portions of the inlet interface portion between the first set of lateral vertices and on an adjoining second set of substantially planar surfaces of the diffuser interface portion between the second set of lateral vertices.

8. The engine inlet as defined in claim 1 wherein the axis of rotation is parallel to a virtual leading edge of a virtual wedge defined by a nominal supersonic operating Mach number for the engine inlet.

9. The engine inlet as defined in claim 8 wherein the leading edge of the engine inlet is defined by a streamline trace from an inlet profile of a projected edge on a virtual shock wave arising from the virtual wedge at the nominal supersonic operating Mach number.

10. A method of maximizing pressure recovery and minimizing drag across a range of subsonic and supersonic velocities, comprising:
    providing an engine inlet, said engine inlet having
    a leading edge forming a substantially kite shaped cross sectional opening of the engine inlet;
    an inlet interface portion downstream of the leading edge, the inlet interface portion having a first top radius, a first bottom radius and a first set of lateral vertices, the first set of lateral vertices having a first arc shape; and
    a fixed diffuser having a diffuser interface portion, the diffuser interface portion having a second top radius, a second bottom radius and a second set of lateral vertices, the second set of lateral vertices having a second arc shape, wherein said second set of lateral vertices mate with the first set of lateral vertices;

rotating the engine inlet about an axis of rotation offset from an exterior surface of the inlet interface portion and the diffuser interface portion, said axis of rotation comprising a common center for the first top radius, the first bottom radius, the second top radius, the second bottom radius, the first arc shape, and the second arc shape, to increase a capture area and a ramp angle; and rotating the engine inlet about the axis of rotation as velocity is increased.

11. The method as defined in claim 10 wherein the step of providing the engine inlet comprises:
   establishing a nominal supersonic Mach number for the engine inlet;
   defining a virtual wedge having a determined angle based on the nominal supersonic Mach number; and,
   defining a streamline trace from an inlet profile for a projected edge on a virtual shock wave arising from the virtual wedge at the nominal supersonic Mach number as the leading edge for the engine inlet.

12. The method as defined in claim 11 further comprising:
   operating at a zero rotation of the engine inlet at the range of subsonic velocities; and,
   rotating the engine inlet about the axis of rotation to at least one intermediate angle thereby changing the capture area and the ramp angle.

13. The method as defined in claim 12 further comprising:
   operating at a predefined rotational angle of the engine inlet about the axis of rotation corresponding to the determined angle of the virtual wedge at the nominal supersonic Mach number.

14. The method as defined in claim 10 wherein
   said inlet interface portion and said diffuser interface portion are engaged in a scrubbing relationship during rotation of the engine inlet.

15. The method as defined in claim 10 wherein the step of providing the engine inlet further comprises:
   establishing a plurality of scales, each of the plurality of scales having a third arc shape defined from the axis of rotation, the each of the plurality of scales telescopically engages one another in at least one first scrubbing relationship to maintain at least one first seal between adjacent scales of the plurality of scales during rotation of the engine inlet, a forward scale engaging the inlet interface portion in a second scrubbing relationship to maintain a second seal between the forward scale and the inlet interface portion during rotation of the engine inlet, and an aft scale engaging the diffuser interface portion in a third scrubbing relationship to maintain a third seal between the aft scale and the diffuser interface portion during rotation of the engine inlet.

16. The method as defined in claim 10 wherein the step of providing the engine inlet further comprises:
   the inlet interface portion having a slot with the first arc shape; and,
   the step of rotating the engine inlet further comprises receiving a termination portion of the diffuser interface portion in the slot.

17. The method as defined in claim 10 wherein the step of providing the engine inlet further comprises:
   establishing a trailing edge of the inlet interface portion having chevrons for geometric relief on a first set of substantially planar scrubbing portions of the inlet interface portion between the first set of lateral vertices and on an adjoining second set of substantially planar surfaces of the diffuser interface portion between the second set of lateral vertices.

\* \* \* \* \*